(12) United States Patent
Paquet

(10) Patent No.: US 8,777,739 B2
(45) Date of Patent: Jul. 15, 2014

(54) GENDER AND AGE BASED GAMEPLAY THROUGH FACE PERCEPTION

(75) Inventor: Philippe Paquet, Studio City, CA (US)

(73) Assignee: Disney Enterprises, Inc., Burbank, CA (US)

(*) Notice: Subject to any disclaimer, the term of this patent is extended or adjusted under 35 U.S.C. 154(b) by 295 days.

(21) Appl. No.: 12/932,380

(22) Filed: Feb. 23, 2011

(65) Prior Publication Data

US 2012/0214584 A1 Aug. 23, 2012

(51) Int. Cl.
*A63F 9/24* (2006.01)
*A63F 13/00* (2014.01)
*G06F 17/00* (2006.01)
*G06F 19/00* (2011.01)

(52) U.S. Cl.
USPC ........ 463/30; 463/1; 463/16; 463/20; 463/21; 463/29; 273/429

(58) Field of Classification Search
USPC ............ 463/1, 16, 21, 29, 30, 20; 705/14, 10; 273/429
See application file for complete search history.

(56) References Cited

U.S. PATENT DOCUMENTS

| | | | |
|---|---|---|---|
| 2002/0074727 A1* | 6/2002 | Glaser | 273/429 |
| 2006/0080175 A1* | 4/2006 | Rowe et al. | 705/14 |
| 2006/0111979 A1* | 5/2006 | Chu | 705/14 |
| 2006/0148560 A1* | 7/2006 | Arezina et al. | 463/29 |
| 2007/0244751 A1* | 10/2007 | Zalewski et al. | 705/14 |
| 2008/0059282 A1* | 3/2008 | Vallier et al. | 705/10 |
| 2012/0021823 A1* | 1/2012 | Youm | 463/29 |

* cited by examiner

*Primary Examiner* — Adetokunbo O Torimiro
(74) *Attorney, Agent, or Firm* — Farjami & Farjami LLP

(57) ABSTRACT

There is provided a system and method for determining a gender and age of a player of a game. There is a method comprising capturing an image of at least one player, and determining the gender and age of the player based on the image. In this manner, the game may be customized to be more relevant or attractive to the player's gender and/or age group.

20 Claims, 3 Drawing Sheets

GENDER AND AGE BASED GAMEPLAY THROUGH FACE PERCEPTION

BACKGROUND OF THE INVENTION

1. Field of the Invention

The present invention relates generally to facial perception. More particularly, the present invention relates to using facial perception to determine a gender and age of a player playing a video game.

2. Background Art

Video game consoles and other computers and devices are capable of presenting interactive video games for players to play. Video games may be played by people of both genders and various ages. However, the game may have been designed for a specific gender or age range. The same gameplay may be entertaining for one gender or age group of players, but not as engaging to another group. For example, a game designed for young children may not appeal to adults. The game may be challenging to a young child, but too simple for an adult.

Games may provide players with configurable options. Such options may tweak certain game settings, but may not otherwise substantially modify the gameplay itself. For example, a female player may be more interested in a click-and-collect type of game. Although the game may provide click-and-collect gameplay, the female player will not be able to otherwise modify the gameplay to provide more click-and-collect gameplay. A male player, who may not be interested in click-and-collect gameplay, may not be able to modify the game by reducing the amount of click-and-collect gameplay.

Video game consoles and modern computers have become increasingly sophisticated. Many such devices have attached cameras, or are configured to accept camera attachments. The games themselves often have access to the camera and its functions. The camera may be capable of capturing an image of the room that houses the game device. As such, the camera can capture the players present in the room. Although the device may have access to this image, in conventional implementations the player must manually input the player's characteristics into the game.

Accordingly, there is a need to overcome the drawbacks and deficiencies in the art by providing a solution enabling the game device to determine the gender and age of the player for a video game without requiring manual intervention from the player, and modifying the game based on the determination.

SUMMARY OF THE INVENTION

There are provided systems and methods for determining the gender and age of a player of a game, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for determining a gender and age of a player of a game using facial perception. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
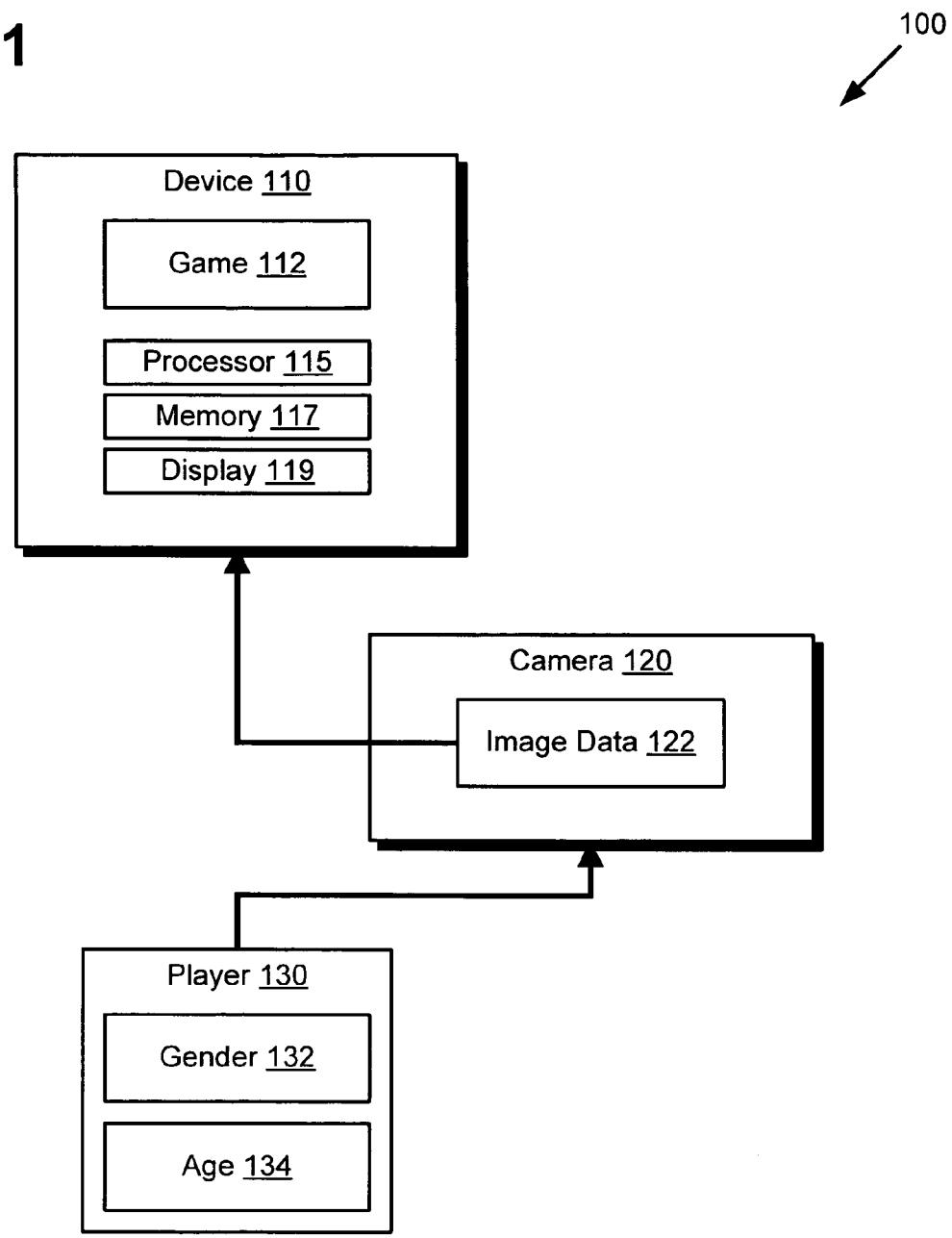
FIG. 1 presents a system for determining a gender and age of a player of a game, according to one embodiment of the present invention.

FIG. 1 presents a system for determining a gender and age of a player of a game using facial perception, according to one embodiment of the present invention. Environment 100 of FIG. 1 includes device 110, camera 120, and player 130. Device 110 includes game 112, processor 115, memory 117, and display 119. Camera 120 includes image data 122. According to the embodiment shown in FIG. 1, player 130 may be characterized by gender 132 and age 134.

In one embodiment, device 110 may comprise any computing machine capable of presenting game 112, as well as accept connections from other devices, such as a camera. For example, device 110 may comprise a Playstation 3™ console, an Xbox 360™ console, or a personal computer. These devices are often located in a room in a house, such as a living room. Alternatively, device 110 may comprise a hand-held computing device, such as a Nintendo DS™ or an Apple iPhone™. Display 119 may comprise any display capable of displaying output from device 110. Display 119 may be integrated with device 110, such as the screen of an iPhone. In alternative embodiments, display 119 may comprise a separate component, externally connected to device 110, such as a television. Processor 115 may comprise a processor capable of performing the tasks of device 110 described below. Memory 117, which may be controlled by processor 115, may comprise an area of memory, such as RAM, where software instructions and algorithms may reside. For example, game 112 may reside in memory 117. Game 112 may comprise any interactive video based experience, such as a video game. Game 112 may present video shown on display 119 which a user or player may interact with through device 110, often with specific objectives. Although in many embodiments game 112 may comprise a video game, the present invention is not limited to entertainment applications. For example, game 112 may instead comprise a vehicle simulation.

Camera 120 may comprise any camera or image capture device capable of connecting to device 110. For example, the Playstation Eye™ may connect to a Playstation 3, whereas the Microsoft Kinect may connect to an Xbox 360, and a webcam may connect to a personal computer. Camera 120 is preferably located in the same room as device 110, situated to capture at least player 130. However, camera 120 may be in another location than device 110, particularly if player 130 is located elsewhere. Although not shown in FIG. 1, camera 120 and device 110 may comprise a single integrated device. For example, the iPhone™ 4 has two built-in cameras. Camera 120 includes image data 122. Image data 122 may comprise images captured by camera 120. Image data 122 may be stored as a file or files on camera 120 and/or device 110, or may alternatively comprise temporary data. In addition, image data 122 may comprise more than one image, or may comprise video data. Image data 122 may provide the raw data that may be used for facial perception, a technique known in the art. Accordingly, camera 120 and image data 122 are not limited to capturing only visual light.

Player 130 may comprise one or more persons actively playing game 112 on device 110 when camera 120 captures image data 122. Alternatively, player 130 may comprise one or more persons who will play game 112 but are spectators at the time camera 120 captures image data 122. Player 130 may be present with device 110, or may be located elsewhere, able to view and/or interact with game 112, and detectable by camera 120. Gender 132 corresponds to the gender of player 130. Likewise, age 134 corresponds to the age of player 130. Age 134 may correspond a specific age, such as eighteen, or may correspond an age range, such as 25-35.

Before device 110 starts a video game, camera 120 may, at the request of device 110, capture image data 122 of player 130. Camera 120 may then send or otherwise make available image data 122 for analysis by device 110. Device 110 may use facial recognition or facial perception techniques, which are known in the art, to analyze image data 122. Alternatively, camera 120 may analyze image data 122. Subsequently, device 110 may determine the genders and ages of player 130 in image data 122, which corresponds to gender 132 and age 134. Device 110 may then make gender 132 and age 134 available to game 112. Game 112 may then be modified according to gender 132 and/or age 134.

Figure 2A:
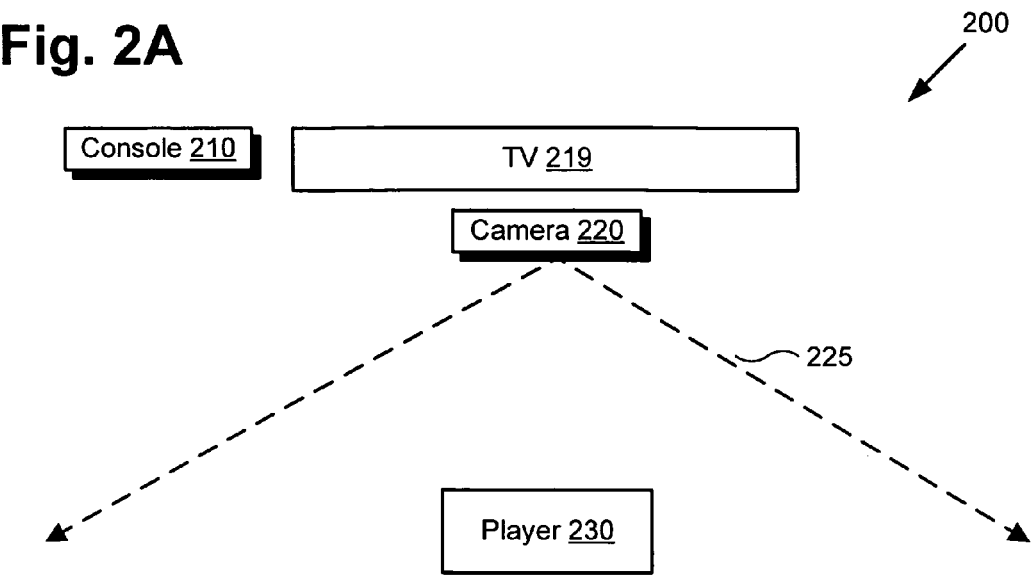
FIGS. 2A and 2B present, respectively, a top-down view and side view of an exemplary environment for determining a gender and age of a player of a game using facial perception, according to one embodiment of the present invention.
Figure 2B:
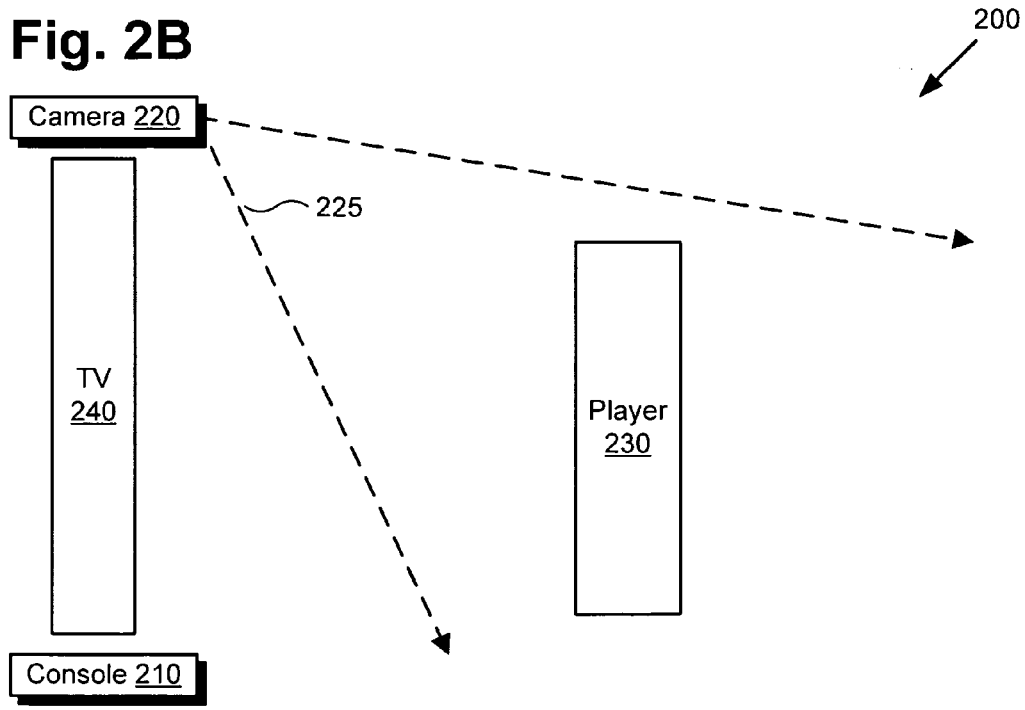

Moving to FIGS. 2A and 2B, FIG. 2A shows a top-down view of an exemplary environment for determining a gender and age of a player of a game, according to one embodiment of the present invention. FIG. 2B shows a side view of the exemplary environment of FIG. 2A. FIGS. 2A and 2B include the same elements. Environment 200 includes console 210, TV 219, camera 220, view 225, and player 230.

Environment 200 may comprise a living room in a typical house. Console 210, which may correspond to device 110 of FIG. 1, may comprise a video game console. Although not depicted in FIGS. 2A and 2B, console 210 may be connected to TV 219 and camera 220. Console 210 may be capable of presenting video games, such as game 112 in FIG. 1, through TV 219, which may correspond to display 119 in FIG. 1. TV 219 may comprise a television set. Camera 220, which may correspond to camera 120 in FIG. 1, may comprise a camera peripheral that may connect to console 210. View 225 corresponds to the range of vision of camera 220. Player 230, which may correspond to player 130 in FIG. 1, may comprise one or more persons in environment 200 who are currently playing game 112 on console 210. Alternatively, player 130 may comprise one or more persons in environment 200 who are not playing game 112.

As depicted in FIG. 2A, TV 219 may be centrally located in environment 200 to provide a good viewing angle for player 230. Console 210 may be located near TV 219, for example beside TV 219, in order to be connected to TV 219. In this embodiment, camera 220 may be located on top of TV 219, as depicted in FIG. 2B, so that view 225 may capture player 230. Once camera 220 captures an image of player 230, console 210 may determine a gender and age of player 230, a process described in further detail below with respect to FIG. 3.

Figure 3:
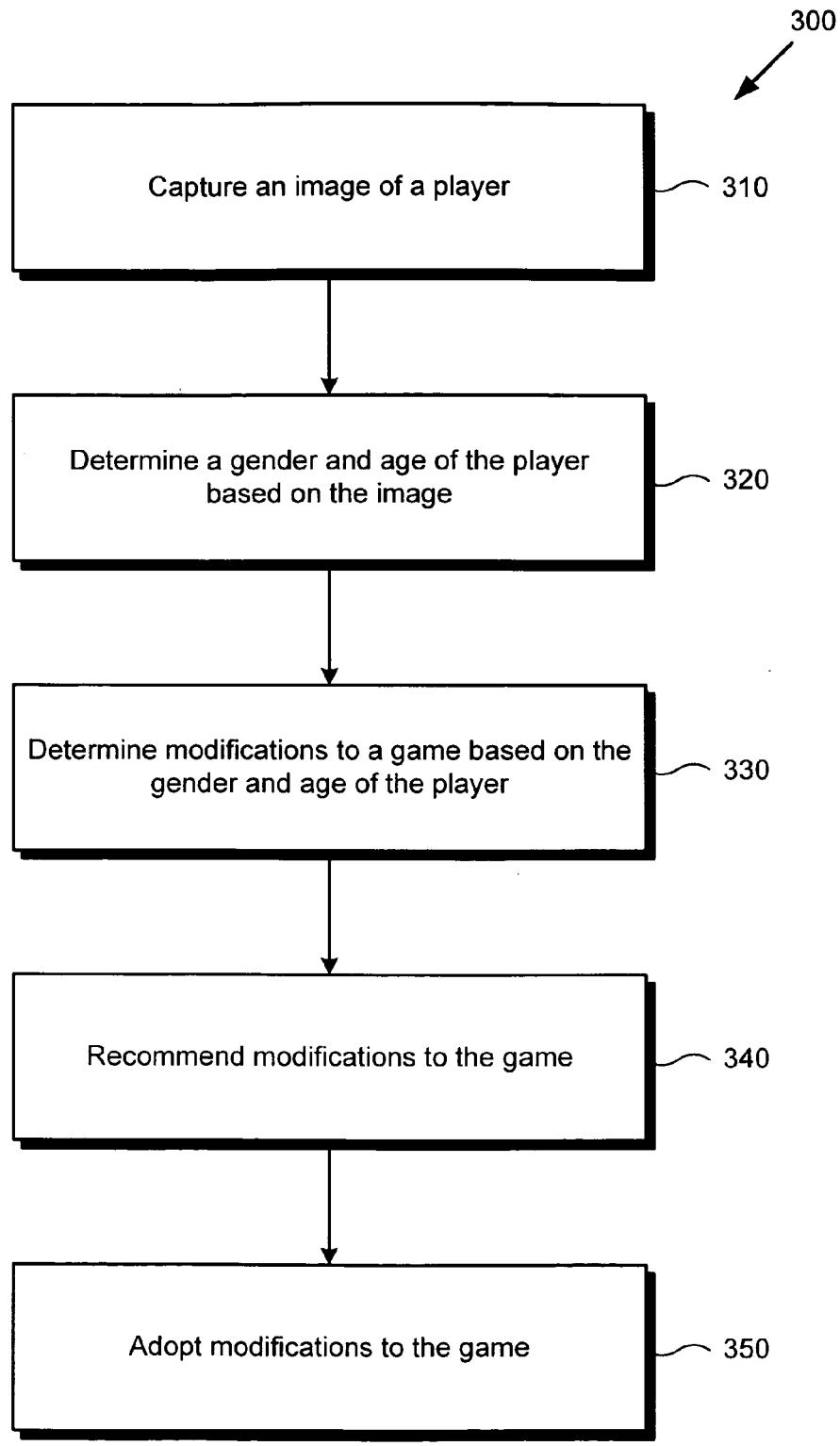
FIG. 3 shows a flowchart describing the steps, according to one embodiment of the present invention, by which a gender and age of a player of a game may be determined using facial perception.

Moving to FIG. 3, FIG. 3 shows a flowchart describing the steps, according to one embodiment of the present invention, by which a gender and age of a player of a game may be determined using facial perception. Certain details and features have been left out of flowchart 300 that are apparent to a person of ordinary skill in the art. For example, a step may comprise one or more substeps or may involve specialized equipment or materials, as known in the art. While steps 310 to 350 indicated in flowchart 300 are sufficient to describe one embodiment of the present invention, other embodiments of the invention may utilize steps different from those shown in flowchart 300.

Referring to step 310 of flowchart 300 in FIG. 3 and environment 100 of FIG. 1, step 310 of flowchart 300 comprises camera 120 capturing image data 122 of player 130. Processor 115, though device 110, may request camera 120 to capture image data 122 before player 130 starts playing game 112 on device 110. Possible times include but are not limited to the following: during a loading screen; during a demo screen; while a startup screen is displayed; or when a menu screen is displayed. Alternatively, camera 120 may capture image data 122 during actual gameplay. For example, camera 120 may capture image data 122 as part of its normal function within game 112, or during downtime or loading screens during gameplay. Preferably, the time between capturing image data 122 and actual gameplay should be minimized, in order to obtain the most recent and accurate image of player 130. In addition, camera 120 preferably captures a clear view of player 130.

Referring to step 320 of flowchart 300 in FIG. 3 and environment 100 of FIG. 1, step 320 of flowchart 300 comprises determining a gender and age of the player of a game based on image data 122. Device 110 may analyze image data 122 using facial recognition or facial perception techniques known in the art to determine gender 132 and age 134. Alternatively, camera 120 may conduct parts or all of the analysis on image data 122. Device 110 may make gender 132 and age 134 available to game 112. Preferably, game 112 has not previously prompted player 130 for gender 132 and age 134.

Referring to step 330 of flowchart 300 in FIG. 3 and environment 100 of FIG. 1, step 330 of flowchart 300 comprises determining modifications to game 112 based on gender 132 and age 134. For example, a possible modification may be to change color schemes. Alternatively, device 110 may determine modifications to game 112 based on gender 132 only, or age 134 only. However, the modifications are not limited to tweaks to game 112.

The modifications may alter the gameplay for player 130. A possible modification may change the type of gameplay. Playtests and other market research may find that specific genders or age groups prefer certain types of gameplay. For example, the market research may suggest that males from ages 15-25 prefer first-person shooters, whereas females from ages 6-12 prefer click-and-collect games. If gender 132 corresponds to male, and age 134 corresponds to 15-25, a relevant modification would be to incorporate more first-person shooter elements into the gameplay. Similarly, if gender 132 corresponds to female, and age 134 corresponds to 6-12, a more relevant modification would be to incorporate more click-and-collect elements into the gameplay. In addition, one or more objectives of game 112 may be modified. For example, research may reveal that males prefer to eliminate a particular enemy in game 112, whereas females prefer to sneak past the particular enemy. If gender 132 corresponds to male, an objective of game 112 may be modified to require player 130 to eliminate the particular enemy. Likewise, if gender 132 corresponds to female, the objective of game 112 may be modified to require player 130 to sneak past the particular enemy. A length of game 112 may also be modified. For example, research may reveal that persons from ages 3-7 are not able to concentrate on game 112 for extended periods of time. Accordingly, the length of game 112 may be shortened when age 134 corresponds to ages 3-7.

In embodiments where player 130 comprises a spectator, the modifications may provide audience participation, rather than alter the main gameplay. A possible modification may involve adding interesting background events and images which market research may reveal appeals to persons corresponding to gender 132 and/or age 134. Such background images may further be based on image data 122, for example using an image of a face of player 130. A more elaborate modification may involve establishing a secondary game in the background. The secondary game may provide player 130 with objectives, appealing to persons corresponding to gender 132 and/or age 134, which do not interfere with the main gameplay.

Referring to step 340 of flowchart 300 in FIG. 3 and environment 100 of FIG. 1, step 340 of flowchart 300 comprises recommending the modifications to game 112. Game 112, through device 110, may present player 130 with options to apply the recommended modifications. Game 112 may alternatively ask player 130 to confirm the modifications. For example, game 112 may present player 130 with an alternative route which may appeal to persons corresponding to gender 132 and age 134. In alternative embodiments, this step may be skipped for some or all modifications.

Referring to step 350 of flowchart 300 in FIG. 3 and environment 100 of FIG. 1, step 350 of flowchart 300 comprises adopting the modifications to game 112. The modifications may have been explicitly accepted in the previous step, such as players 130 taking the alternative route mentioned in the previous example. Game 112 may then adopt the accepted modifications and alter its gameplay accordingly.

Other modifications may be automatically adopted, particularly if step 340 was skipped. For example, game 112 may automatically adopt interesting background scenery if player 130 comprises a spectator. In another example, game 112 may automatically alter its gameplay to appeal to persons corresponding to gender 132 and/or age 134. Such alterations may be subtly or drastically alter game 112.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A device for determining a gender and an age of a player and at least one spectator of a game, the device comprising a processor configured to:
   capture an image;
   determine the gender and age of the player and at least one spectator based on the image using at least one of facial recognition and facial perception;
   prompt the player for one or more modifications to the game, wherein the one or more modifications are based on the gender and age of the player;
   apply the one or more modifications to the game based on the gender and the age of the player if the player accepts the one or more modifications in response to the prompt;
   create a secondary game within the game based on the gender and the age of the at least one spectator; and
   present the game including the secondary game and the one or more modifications on a display.

2. The device of claim 1, wherein the device does not ask the player for the gender and age of the player.

3. The device of claim 1, wherein the game is modified without confirmation from the player.

4. The device of claim 1, wherein the processor is further configured to:
   determine, during loading screens, that the at least one spectator is present; and
   modify the secondary game in response to determining if the at least one spectator is present.

5. The device of claim 1, wherein a type of gameplay of the game is modified based on the gender and age of the player.

6. The device of claim 1, wherein an objective of the game is modified based on the gender and age of the player.

7. The device of claim 1, wherein a length of the game is modified based on the gender and age of the player.

8. The device of claim 1, wherein a background element of the game is modified based on the gender and age of the player.

9. The device of claim 1, wherein the device is further configured to modify the game based solely on the gender of the player.

10. The device of claim 1, wherein the device is further configured to modify the game based solely on the age of the player.

11. A method for use by a device having a processor for determining a gender and an age of a player and at least one spectator of a game, the method comprising:
   capturing, by the processor, an image;
   determining the gender and age of the player and the at least one spectator based on the image using at least one of the facial recognition and facial perception;
   prompting the player for one or more modifications to the game, wherein the one or more modifications are based on the gender and the age of the player;
   applying the one or more modifications to the game based on the gender and the age of the player if the player accepts the one or more modifications in response to the prompt;
   creating a secondary game within the game based on the gender and the age of the at least one spectator; and
   presenting the game including the secondary game and the one or more modifications on a display.

12. The method of claim 11, wherein the player is not asked for the gender and age of the player.

13. The method of claim 11, wherein the game is modified without confirmation from the player.

14. The method of claim 11, further comprising:
   determining, during loading screens, that the at least one spectator is present; and
   modify the secondary game in response to determining if the at least one spectator is present.

15. The method of claim 11, wherein a type of gameplay of the game is modified based on the gender and age of the player.

16. The method of claim 11, wherein an objective of the game is modified based on the gender and age of the player.

17. The method of claim 11, wherein a length of the game is modified based on the gender and age of the player.

18. The method of claim 11, wherein a background element of the game is modified based on the gender and age of the player.

19. The method of claim 11, wherein the modifying the game is based solely on the gender of the player.

20. The method of claim 11, wherein the modifying the game is based solely on the age of the player.

\* \* \* \* \*

UNITED STATES PATENT AND TRADEMARK OFFICE
CERTIFICATE OF CORRECTION

| | |
|---|---|
| PATENT NO. | : 8,777,739 B2 |
| APPLICATION NO. | : 12/932380 |
| DATED | : July 15, 2014 |
| INVENTOR(S) | : Philippe Paquet |

It is certified that error appears in the above-identified patent and that said Letters Patent is hereby corrected as shown below:

In the claims,

Column 6, line 40, "gender and age" should be changed to --gender and the age--.

Column 6, line 42, "of the facial recognition" should be changed to --of facial recognition--.

Signed and Sealed this
Twenty-third Day of December, 2014

Michelle K. Lee
*Deputy Director of the United States Patent and Trademark Office*